(12) United States Patent
Springer et al.

(10) Patent No.: US 7,900,581 B2
(45) Date of Patent: Mar. 8, 2011

(54) DEVICE FOR THE MEASUREMENT OF A MILK STREAM

(75) Inventors: Andreas Springer, Beckum (DE); Juan Olmedo, Oelde-Lette (DE); Reinhold Knoche, Beckum-Vellern (DE)

(73) Assignee: GEA Farm Technologies GmbH, Bonen (DE)

( * ) Notice: Subject to any disclaimer, the term of this patent is extended or adjusted under 35 U.S.C. 154(b) by 151 days.

(21) Appl. No.: 11/818,677

(22) Filed: Jun. 15, 2007

(65) Prior Publication Data

US 2008/0006210 A1 Jan. 10, 2008

Related U.S. Application Data

(60) Provisional application No. 60/814,969, filed on Jun. 20, 2006.

(51) Int. Cl.
*A01J 3/00* (2006.01)
(52) U.S. Cl. ..................................... 119/14.15
(58) Field of Classification Search ............... 119/14.14, 119/14.15; 73/861.02, 861.08
See application file for complete search history.

(56) References Cited

U.S. PATENT DOCUMENTS

| | | | | |
|---|---|---|---|---|
| 3,989,009 A | * | 11/1976 | Robar et al. | 119/14.08 |
| 4,010,715 A | * | 3/1977 | Robar et al. | 119/14.14 |
| 4,714,048 A | * | 12/1987 | Jefferies et al. | 119/14.08 |
| 5,046,510 A | * | 9/1991 | Ams et al. | 600/584 |
| 5,245,946 A | | 9/1993 | Hoefelmayr et al. | |
| 6,073,580 A | * | 6/2000 | Graupner et al. | 119/14.08 |
| 6,598,560 B1 | * | 7/2003 | van den Berg | 119/14.08 |
| 6,776,119 B2 | * | 8/2004 | Vijverberg et al. | 119/14.14 |
| 2002/0148408 A1 | * | 10/2002 | Gompper et al. | 119/14.14 |

FOREIGN PATENT DOCUMENTS

| | | |
|---|---|---|
| DE | 37 37 607 A1 | 5/1989 |
| DE | 295 03 450 U1 | 4/1995 |
| EP | 0 509 288 A1 | 10/1992 |

OTHER PUBLICATIONS

English language Abstract, Translated Description and Claims of DE 37 37 607 A1, European Patent Office's esp@cenet.com database, 14pp, May 24, 1989.

* cited by examiner

*Primary Examiner* — Rob Swiatek
*Assistant Examiner* — Ebony Evans
(74) *Attorney, Agent, or Firm* — Smith Law Office

(57) ABSTRACT

In order to measure a milk flow, a device is proposed that has a channel that has an inlet and an outlet. At least two electrically conducting element are provided in the channel that are arranged at a distance from one another. At least one element has an essentially annular form. Furthermore, at least one element has an essentially pin-shaped form. With the aid of this design according to the invention of a device for the measurement of a milk stream, a relatively simple construction is achieved, which has a relatively high measuring accuracy.

25 Claims, 2 Drawing Sheets

DEVICE FOR THE MEASUREMENT OF A MILK STREAM

This application claims the benefit of Provisional Application No. 60/814,969 filed Jun. 20, 2006.

FIELD OF THE INVENTION

The object of the invention refers to a device for the measurement of a milk stream that flows in a channel having an inlet and an outlet. At least two electrically conducting elements are provided within the channel.

DESCRIPTION OF THE RELATED ART

Devices for the measurement of a milk stream are known in different designs and embodiments. From Utility Model 295 03 450, a device is known that has a flow-through channel in which two electrodes are arranged. For example, threshold value testing can be performed with such a device. The threshold value testing forms a basis for the control of the milking process. For example, if the measured value falls below the threshold value, the milking machine is removed.

Another embodiment for the measurement of a milk stream was also known previously from EP 0 509 288 A1. This device also has a channel, in which two electrodes are provided at a distance from one another. Furthermore, EP 0 509 288 describes devices for the measurement of a milk stream, in which the measurement is performed capacitatively or optically.

A prerequisite for the measurement of a milk stream according to EP 0 509 288 is that the device be located in a section of an ascending pipeline, since the length of a milk plug is measured.

The measurement of the milk stream and especially the determination of the amount of milk presents quite a few problems, since the milk can also flow in the channel as a foaming fluid. Thus, the milk stream can have a liquid phase and a foam phase, the conductance values of which differ. In an attempt to solve this problem, in DE-A1-31 37 607, a method was proposed for performing the measurement on foaming fluids, in which a measured value is obtained for a fluid contained in a container at different height levels, the measured value being dependent on a parameter of the fluid. For this purpose, in order to measure the specific density of the milk at different height levels, a reference measuring section containing an essentially degassed fluid is provided. Depending on whether a corresponding measured value obtained in air is larger or smaller than the reference value obtained in the reference section, for each height level a ratio is produced, corresponding to the ratio of the measured reference value and the measured value at this height level, or corresponding to the Kerr value of this ratio. In order to be able to perform this, a measuring chamber is provided, which has a multiple number of electrodes arranged above one another, which form the corresponding height levels.

The cost of the apparatus for constructing such a device as well as for evaluating the measured results is relatively high.

SUMMARY OF THE INVENTION

Based on this, the task of the present invention is to provide a device with simple construction for the measurement of a milk stream. A further task is to provide a device for the measurement of a milk stream with which a reliable evaluation of the amount of milk flow is possible.

The device according to the invention for the measurement of a milk flow has a channel having an inlet and an outlet. In the channel at least two electrically conducting elements are provided, which are arranged at a distance from one another. At least one element has an essentially annular form. Furthermore, at least one element has a pin-shaped form. With this design according to the invention of a device for the measurement of a milk stream, a relatively simple design of the device is accomplished. Surprisingly, a relatively high measurement accuracy is achieved.

The pin-shaped element, of which there must be at least one, can have differently shaped cross sections. Hereby the pin-shaped element can have a polygonal, specially triangular, quadrangular or six-cornered shape. It is also possible for the cross section to have an oval or essentially circular form. It is not strictly necessary for the pin-shaped element to have a cross-sectional area that is constant when viewed in the longitudinal direction of the element. It is possible to construct the element so that it has a cross section that varies along the length of the element. Hereby the pin-shaped element can have a larger cross section at least at one end than in the middle area. The pin-shaped element has a clear breadth that is smaller in comparison to the length of the element, preferably significantly smaller.

Preferably the pin-shaped element is made of at least one electrically conducting material. The material can be a metal and/or an electrically conducting plastic.

The device according to the invention for the measurement of a milk stream can also be used for recognizing that a teat cup or milking machine has been knocked off. This due to the fact that, since the milk stream is measured continuously with the electrodes, a sudden change in milk stream can be recognized almost immediately. If a teat cup or an entire milking machine is knocked off, then the flow velocity in the channel increases due to the inflow of air. Moreover, through the sudden change of the conductance value or of the electrical conductivity of the fluid flowing in the channel, it can be concluded that at least one teat cup or the entire milking machine has been knocked off.

In order to separate the electrically conducting elements, of which there must be at least two, from one another, it is proposed that, between two neighboring elements, the channel have at least one section made of an electrically nonconducting material. Especially preferred is a design of the device in which the channel is made of at least one electrically nonconducting polymer.

Hereby an embodiment is especially preferred in which the annular element, of which there must be at least one, is an integral component of the channel. The arrangement of the annular element should preferably be such that the annular element has an inner cross section that essentially corresponds to an inner cross section of the channel. If the channel has a circular cross section, then the inner diameter of the annular element corresponds essentially to the inner diameter of the channel. With such a design in the channel, one can ensure that no discontinuities arise that would cause turbulences within the flowing milk due to the annular element. Moreover, pressure losses are reduced by means of such an arrangement.

The device, which has a channel, is preferably arranged in such a way that the channel, which has a longitudinal axis, is inclined from the vertical. In this way it is achieved that the milk can flow out of the channel. This also applies to cleaning fluids or disinfecting fluids used for cleaning the channel.

According to still another advantageous embodiment of the device according to the invention it is proposed that the ratio of the width (B) of the annular element to the inner diameter of the annular element, of which there must be at least one, lie between 0.1 and 25, preferably between 3 and 5. Especially preferred is an embodiment, in which the ratio of the width of the annular element to the inner diameter of the annular element, of which there must be at least one, is about 4.3. Especially preferred is an embodiment of the device in which the annular element has a width of about 5 mm. This width is especially preferred for a channel with an inner diameter of 25 mm.

According to still another advantageous embodiment of the invention, it is proposed that the pin-shaped element, of which there must be at least one, have an essentially circular cross section. With this form of the cross section, a uniform flow in the element is achieved. Moreover, the pin-shaped element does not have an adverse influence on the flow of the milk in the channel.

According to still another advantageous embodiment of the invention, it is proposed that the pin-shaped element, of which there must be at least one, have a width, preferably a diameter, that lies between 1 mm and 8 mm. Especially preferred is a width or a diameter that lies between 2.5 and 3.5 mm. It was found that a width or a diameter of the pin-shaped element of 3 mm is an especially preferred embodiment.

The pin-shaped element is preferably arranged radially in the channel. Preferably it has a length that is the same as the diameter of the channel. Preferably the pin-shaped element intersects the longitudinal axis of the channel essentially at a right angle. This is not strictly necessary. The pin-shaped element can intersect the longitudinal axis of the channel at an angle between 45° and 135°. As a result of the preferred design of the arrangement of the pin-shaped element it is ensured that the milk stream is always in contact with the pin-shaped element.

According to a still further advantageous embodiment of the device, it is proposed that two neighboring elements, specifically an annular element and a pin-shaped element be arranged at a distance L from one another, The ratio of the distance to the inner diameter of the element, of which there must be at least one, lies between 0.2 and 2.0. A design is preferred in which the ratio of the distance to the inner diameter of the annular element, of which there must be at least one, is between 0.4 and 0.7. It is especially proposed that this ratio lie at about 0.55. If the distance between an annular element and the pin-shaped element is 12 mm, then relatively safe values are achieved for the measurement of the milk stream.

Preferably, the arrangement of the elements is chosen so that, viewed in the direction of the milk stream, the pin-shaped element is arranged after at least one annular element.

The annular element and the pin-shaped element are preferably connected via an electronic circuit, so that the elements form electrodes with the aid with which and with the aid of the circuit the electrical conductivity and/or conductance of the flowing milk is determined. Especially preferred is an embodiment of the invention in which the channel has at least one chamber. Preferably the chamber, of which there must be at least one, is arranged after the elements when viewed in the direction of flow of the milk. The chamber has at least one measuring unit for the measurement of the conductance value of the milk. With the aid of the measuring unit and the chamber, the changing course of the milk conductance values as a function of time can be determined reliably. This changing course permits conclusions to be drawn with regard to the state of health of the milk-producing animal. Optionally, the measuring unit can be equipped with at least one temperature sensor. This temperature sensor, of which there would be at least one, can be used for temperature compensation of the electrical conductance value measurement.

The conductance measurement also makes it possible to determine the first milk. Based on the conductance value of the first milk, conclusions can be drawn with regard to a possible mastitis of the milk-producing animal.

The chamber has an inlet opening. At least one flow element is arranged before the inlet opening. With the flow element, the milk streams can flow into the chamber without large turbulence occurring. This design has the advantage that the device for measuring a milk stream, especially for the determination of the amounts of milk in the milk-volume-flow-range from 0.0 to 9.0 L/min. Hereby a relatively high accuracy regarding the amount of milk is obtained.

The flow element arranged before the inlet opening of the chamber is preferably formed by the pin-shaped element. Through this design of the device, a simplification of the device is achieved, since the pin-shaped element serves as the electrode as well as the flow element. The flow element throws a flow shadow onto the chamber, so that the development of turbulences that would influence the measurement process in the chamber and that occur during flow, especially at flow rates higher than 4 L/min, are prevented.

The measurement unit, which is arranged in the chamber, preferably comprises two electrodes. The electrodes can be designed to be pin-shaped. Preferably they have a diameter of approximately 1 mm, especially 1.5 mm. The electrodes are arranged next to one another viewed in the direction of flow and are preferably at a distance of approximately 7 mm.

According to yet another advantageous embodiment of the invention, it is proposed that the chamber have an outlet opening, preferably an outlet opening the cross section of which widens. As a result of this, the flowing out of the milk that is collecting in the chamber is facilitated. The widening is preferably conical, so that particles that may occur in the milk and enter the chamber will not lead to a plugging up of the outlet opening.

According to a still further inventive idea, a device is proposed for the determination of a milk quantity comprising a device, whereby at least one electronic circuit is provided, which is connected to the electrically conducting elements, of which there must be at least two, through signal lines. As a result of the design of the device and/or arrangement according to the invention it is achieved that the determination of the amount of milk in the milk stream can be performed. Since the milk stream does not have to change flow direction, there will be no perturbing pressure fluctuations either. Also no moving parts are necessary for the recording of the measured data. The device or the arrangement therefore requires very little maintenance and is simple to clean and disinfect.

Other details and advantages of the invention will be explained with the aid of the practical examples depicted in the drawings, without the object of the invention being limited to these concrete practical examples.

DETAILED DESCRIPTION OF THE PREFERRED EMBODIMENTS

Figure 1:
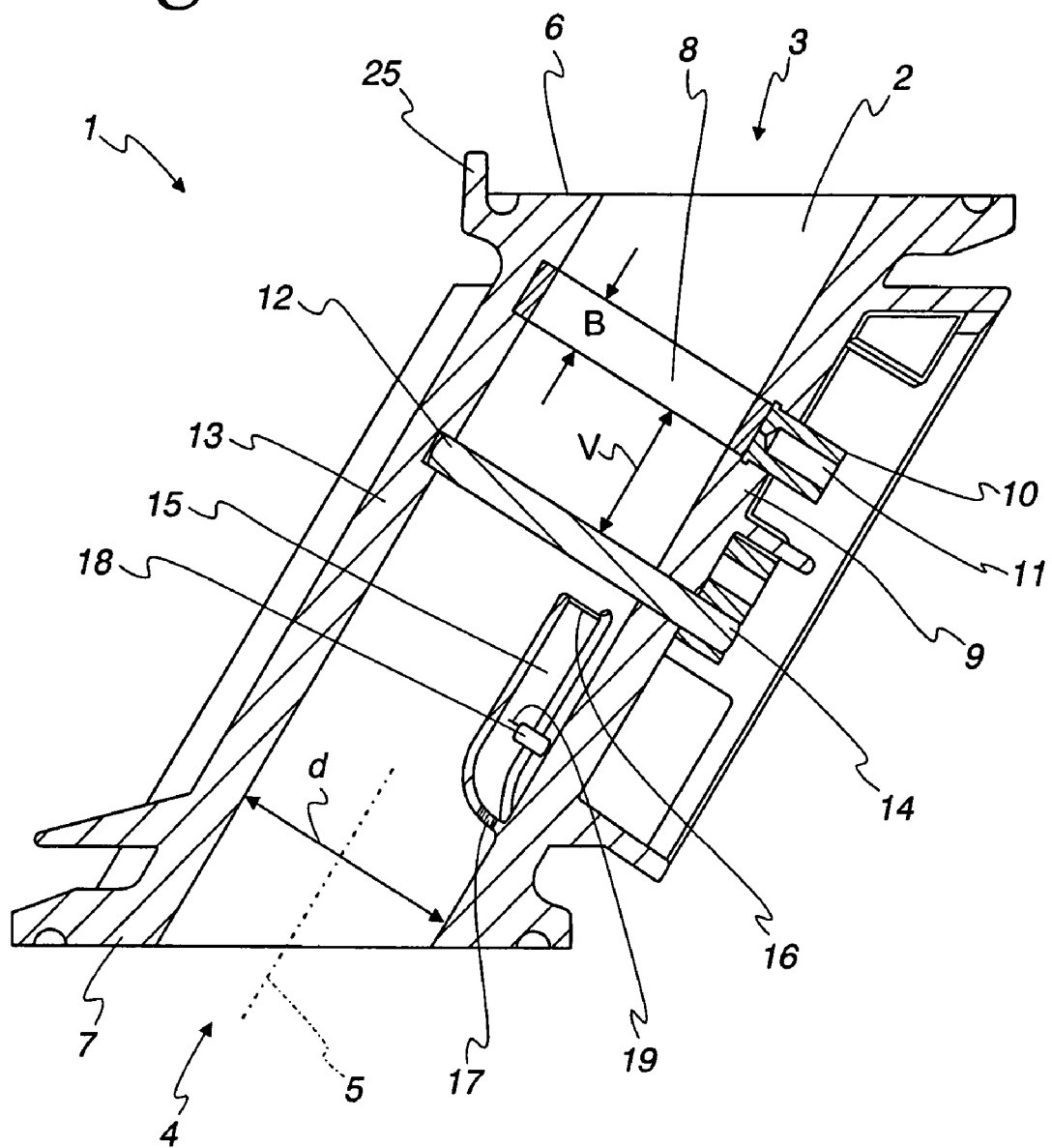
FIG. 1 shows a device in cross section and
FIG. 2 show the device in combination with other parts of a milking installation.

FIG. 1 shows a device for the measurement of a milk stream. The device has a component 1 of essentially tubular design. Component 1 is made preferably of an electrically nonconducting plastic. The component 1 is preferably manufactured by the injection molding method. The component may consist of polysulfone (PSU), Polyamide 12 (PA 12) or polyphenylsulfone (PPSU). Other plastics that are compatible with foodstuffs are also suitable.

Component 1 has a channel 2. The channel has an inlet 3 and an outlet 4. The channel 2 has an essentially circular cross section. Reference number 5 designates the longitudinal axis of the channel. When the device is mounted, the longitudinal axis 5 is inclined to the vertical. As a result of this, the milk stream can flow partly on the wall 9 of channel 2.

Flanges 6, 7 are provided on both ends of channel 2, being suitable and intended for connection to other components of a milking installation.

A milk stream, which is not shown, enters through inlet 3 into channel 2 and flows through this, whereby the milk stream flows out from the channel through outlet 4. It can be seen from the representation in FIG. 1 that an electrically-conducting annular element 8 is provided in channel 2. The annular element 8 has an inner diameter d, which essentially corresponds to the inner diameter of channel 2. The annular element is an integral components of channel 2. Through the wall 9 of the component 1, a connecting element 10 extends, and this is connected electrically to the annular element 8. In the practical example shown, the connecting element has an inner thread 11 into which a screw can be screwed in, so that, for example, a signal line can be connected to the connecting element and can be attached to it.

Viewing in the direction of flow of a milk stream, an electrically conducting element 12 designed in a pin shape is provided behind the annularly designed element 8. The annularly designed element 8 has a dimension B in the direction of milk flow. The distance L between the annular element and the pin-shaped element is preferably 12 mm in the practical example shown. The pin-shaped element 12 penetrates through wall 9. A front end of the pin-shaped element extends partially into the opposite wall 13. It can be seen from the representation in FIG. 1 that the pin-shaped element 12 intersects the longitudinal axis 5 of the channel at an angle of about 90°. The pin-shaped element 12 is arranged essentially parallel to the front surfaces of the annular element 8.

The other end region 14 of the pin-shaped element protrudes from wall 9. It provides the possibility of connecting a signal line.

The pin-shaped element 12 is preferably designed with a circular cross section. Specifically; it has a diameter of about 3.0 mm. The annular element 8 and the pin-shaped element 12 are joined through an electric circuit, which is not shown. The electrical conductivity of the milk is measured with the electrically conducting elements 8, 12.

Below the pin-shaped element 12, a chamber 15 is arranged. The chamber 15 is provided in the area of wall 9. Chamber 15 has an inlet opening 16, through which a part of the flowing milk can enter into the chamber 15. An outlet opening 17 is provided at the lowest point of chamber 15. The outlet opening 17 preferably has a diameter of about 1.4 mm. The outlet opening is preferably designed so that its cross section widens outward. By means of this widening from the inside to the outside it is ensured that any particles that may be present in the milk cannot settle in the outlet opening. Larger contaminant particles are washed from the chamber 15 by the flow of the milk.

A measuring device 18 is arranged inside the chamber 15. The measuring device 18 is formed from two electrodes 19 arranged next to one another. The electrodes 19 are designed essentially in the form of pins. Preferably they have a diameter of about 1.5 mm. The arrangement of the electrodes 19 is chosen so that they are at a distance of about 7 mm from one another. The electrodes 19 are connected through a possible connection that is not shown to a circuit that is not shown. The electrodes 19 protrude about 3 to 4 mm into chamber 15. The conductivity measurement of the milk is performed in chamber 15 with the aid of the measuring unit 18.

The pin-shaped element 12 forms a flow element that is arranged before the inlet opening 16 of the chamber 15 in such a way that development of turbulences in chamber 15 is at least reduced if not completely prevented. As a result of the prevention of turbulences in chamber 15, the conductivity measurement on the milk within chamber 15 can occur with high reliability. Measurement errors, which arise from the fact that air enters into the milk flowing into chamber 15, which would alter the conductivity of the mixture, could be almost entirely eliminated by the design.

The design according to the invention of the device for the measurement of a milk stream yields measured values that have a high accuracy. The design of the device is chosen so that the channel and the chamber can be well cleaned and emptied. Emptying of the chamber 15 occurs automatically. The device can provide a signal to a control device both at the start as well as at the end of a milking process, so that, for example, upon the ending of a milking process the pulsation is turned off and a signal is generated for the removal of the milking equipment. The device can also be used as a so-called kick-off sensor. If a sudden entry of air occurs during a milking process, then the conductivity measured between the electrodes 8 and 12 also decreases suddenly. Depending on the design of the circuit, not shown, and on the time of the kick-off in the milking process, a signaling or removal of the milking equipment can occur.

With the aid of the conductance measurement performed in chamber 15, the changing course of the conductivity value of the milk can be determined This changing course permits conclusions to be drawn regarding the state of health of the milk-producing animals.

Figure 2:
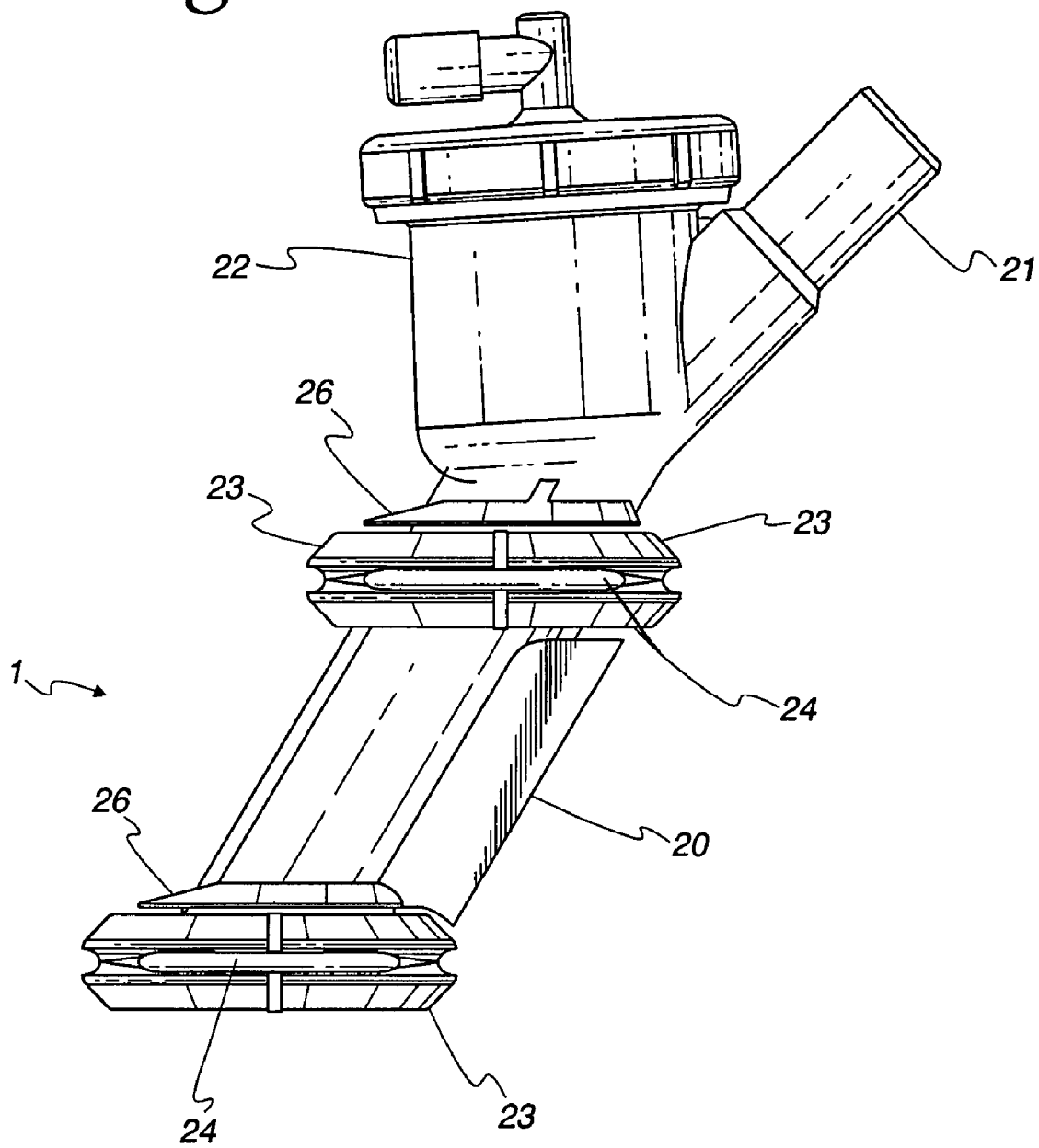

FIG. 2 shows the arrangement of the device in connection with other components of a milking installation. The same components of the device are provided with the same reference numbers. In FIG. 2, one can see component 1. It can be seen that the component 1 has a connection chamber 20, which holds the connections of the electrically conducting elements and of the electrodes. Component 1 is connected to a milk pipeline 21. Milk pipeline 21 has a shutoff 22 that can be pneumatically actuated. Such a shutoff is known, for example, from Utility Model 295 03 450.5.

Milk pipeline 21 has a flange designed correspondingly to flange 6. The flanges are connected to one another through two joining elements 23. The joining elements 23 have a half-bowl-shape. They have grooves inside, into which the flanges engage. Using a spring-elastic element 24, the joining elements 23 are joined with non-positive locking. A corresponding connection can be produced with the flange of component 1 to another part of the milking installation. Component 1 has a flange 6. Flange 6 has a projection 25 in the form of a nose. The projection engages into a correspondingly formed recess of a flange of the shutoff 22. With this measure, a defined mounting position is achieved as well as a nonrotatable joining between components 1 and the shutoff 22.

It can be seen from the representation in FIG. 2, that the joining elements 23 are provided with deflectors 26 formed correspondingly on component 1 so that contamination at the joining point is at least reduced.

Through the design of the installation according to the invention for the measurement of a milk stream, a conductivity measurement in the range from 1 mS/cm to 12 mS/cm can be performed reliably. Moreover, the device according to the invention opens up the determination of milk quantities in the milk volume flow range from 0.0 to 9.0 L/min.

The invention claimed is:

1. A device for measuring milk flow, the device comprising:
    a housing having an inlet, an outlet, and a channel between the inlet and the outlet, wherein the channel has an upstream end and a downstream end;
    a chamber disposed in the channel, and the chamber includes a chamber inlet;
    a plurality of electrically conducting elements, spaced apart from one another in the channel, wherein one electrically conducting element is an annular element and one electrically conducting element is substantially straight with a first end and a second end, the annular element is upstream from the chamber and the substantially straight electrically conducting element is upstream from the chamber inlet;
    a milk conductivity measuring unit disposed at least partially in the chamber; and
    a flow element arranged at least partially upstream from the chamber inlet and the flow element is formed at least partly defined by the substantially straight electrically conducting element.

2. The device according to claim 1, wherein the channel has a section between two electrically conducting elements, and the section is made of an electrically non-conducting material.

3. The device according to claim 1, wherein the channel is at least partially formed from an electrically nonconducting polymer.

4. The device according to claim 1, wherein the channel defines a longitudinal axis, which is inclined with respect to a vertical.

5. The device according to claim 1, wherein the annular element has an inside cross-section dimension that is substantially the same as an inner cross-section dimension of the channel.

6. The device according to claim 1, wherein the annular element has an inside diameter that is substantially the same as an inner diameter of the channel.

7. The device according to claim 1, wherein the annular element is an integral component of the housing and defines at least a portion of the channel.

8. The device according to claim 1, wherein the annular element has a width, and the ratio of the width of the annular element to an inside diameter of the annular element is between about 0.1 and about 25.

9. The device according to claim 1, wherein the annular element has a width, and the ratio of the width of the annular element to an inside diameter of the annular element is between about 3 and about 5.

10. The device according to claim 9, wherein the substantially straight electrically conducting element has a diameter between about 1 mm and about 8 mm.

11. The device according to claim 9, wherein the substantially straight electrically conducting element has a diameter between about 2.5 mm and about 3.5 mm.

12. The device according to claim 9, wherein the substantially straight electrically conducting element has a diameter of about 3.2 mm.

13. The device according to claim 1, wherein the annular element has a width, and the ratio of the width of the annular element to an inside diameter of the annular element is about 4.3.

14. The device according to claim 1, wherein the substantially straight electrically conducting element has a substantially circular transverse cross-section.

15. The device according to claim 1, wherein the substantially straight electrically conducting element intersects a longitudinal axis of the channel at an angle between about 45° and about 135°.

16. The device according to claim 1, wherein the substantially straight electrically conducting element intersects a longitudinal axis of the channel at an angle of about 90°.

17. The device according to claim 1, wherein the electrically conducting elements are spaced apart a distance and the ratio of that distance to an inside diameter of the annular element is between about 0.2 and about 2.0.

18. The device according to claim 1, wherein the electrically conducting elements are spaced apart a distance, and the ratio of that distance to an inside diameter of the annular element between about 0.4 and about 0.7.

19. The device according to claim 1, wherein the electrically conducting elements are spaced apart a distance, and that ratio of the distance to an inside diameter of the annular element is about 0.55.

20. The device according to claim 1, wherein the substantially straight electrically conducting element is arranged downstream from the annular element.

21. The device according to claim 1, wherein the chamber is disposed downstream from the electrically conducting elements.

22. The device according to claim 1, wherein the milk conductivity measuring unit includes a plurality of electrodes.

23. The device according to claim 1, wherein the chamber defines an outlet.

24. The device according to claim 1, wherein the milk conductivity measuring unit includes a temperature sensor.

25. The device according to claim 1, and further comprising:
    an electronic circuit connected through signal lines to the electrically conducting elements.

* * * * *

UNITED STATES PATENT AND TRADEMARK OFFICE
CERTIFICATE OF CORRECTION

| | | |
|---|---|---|
| PATENT NO. | : 7,900,581 B2 | Page 1 of 1 |
| APPLICATION NO. | : 11/818677 | |
| DATED | : March 8, 2011 | |
| INVENTOR(S) | : Andreas Springer, Juan Olmedo and Reinhold Knoche | |

It is certified that error appears in the above-identified patent and that said Letters Patent is hereby corrected as shown below:

In claim 1, line 24, the word "defined" should be deleted.

Signed and Sealed this
Third Day of May, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,900,581 B2 | Page 1 of 1 |
| APPLICATION NO. | : 11/818677 | |
| DATED | : March 8, 2011 | |
| INVENTOR(S) | : Andreas Springer, Juan Olmedo and Reinhold Knoche | |

It is certified that error appears in the above-identified patent and that said Letters Patent is hereby corrected as shown below:

In claim 1, Column 7, line 24, the word "defined" should be deleted.

This certificate supersedes the Certificate of Correction issued May 3, 2011.

Signed and Sealed this
Thirty-first Day of May, 2011

David J. Kappos
*Director of the United States Patent and Trademark Office*